(12) United States Patent
Yamaguchi et al.

(10) Patent No.: US 7,453,625 B2
(45) Date of Patent: Nov. 18, 2008

(54) METHOD OF PRODUCING DOMAIN INVERSION PARTS AND OPTICAL DEVICES

(75) Inventors: Shoichiro Yamaguchi, Ichinomiya (JP); Makoto Iwai, Kasugai (JP); Yuichi Iwata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 497 days.

(21) Appl. No.: 11/336,308

(22) Filed: Jan. 20, 2006

(65) Prior Publication Data

US 2006/0133767 A1 Jun. 22, 2006

Related U.S. Application Data

(63) Continuation of application No. PCT/JP2004/011575, filed on Aug. 5, 2004.

(30) Foreign Application Priority Data

Aug. 21, 2003 (JP) .............................. 2003-297042

(51) Int. Cl.
*G02F 1/00* (2006.01)
*G02F 1/35* (2006.01)

(52) U.S. Cl. ...................... 359/322; 359/321; 359/326; 359/328; 385/122; 361/225

(58) Field of Classification Search ................. 359/245, 359/321, 322, 326–332; 385/40, 122, 129–131, 385/147; 427/466; 361/225; 204/164, 549
See application file for complete search history.

(56) References Cited

U.S. PATENT DOCUMENTS 5,652,674 A 7/1997 Mizuuchi et al. ............ 359/326

(Continued)

FOREIGN PATENT DOCUMENTS

| EP | 0 699 934 A2 | 3/1996 |
| EP | 0 718 671 | 6/1996 |
| JP | 08-220578 A1 | 8/1996 |
| JP | 2000-147584 A1 | 5/2000 |

OTHER PUBLICATIONS

Haycock, P.W. et al., "A method of poling $LiNbO_3$ and $LiTaO_3$ below $T_c$", Applied Physics Letters, vol. 48, No. 11, Mar. 17, 1986, pp. 698-700.

*Primary Examiner*—Loha Ben
(74) *Attorney, Agent, or Firm*—Burr & Brown

(57) ABSTRACT

A comb electrode 3 is provided on a first main face 2a and a uniform electrode 4 is provided on a second main face 2b of a substrate made of a ferroelectric single crystal of a single domain, and a voltage is applied on the comb electrode 3 and the uniform electrode 4 to produce domain inversion part. It is laminated, on the substrate, an underlying substrate comprising a main body 5, a first conductive film 6 provided on a first main face 5a and a second conductive film 7 provided on a second main face 5b of the main body 5. The uniform electrode 4 is electrically conducted with the first conductive film 6 and a voltage is applied on the comb electrode 3 and the second conductive film 7 to form a domain inversion part in the substrate 2.

5 Claims, 5 Drawing Sheets
(2 of 5 Drawing Sheet(s) Filed in Color)

U.S. PATENT DOCUMENTS 6,353,495 B1 * 3/2002 Mizuuchi et al. ............ 359/326
6,654,529 B1 * 11/2003 Kawaguchi et al. ......... 385/122
6,747,787 B2 * 6/2004 Furukawa et al. ........... 359/326
6,795,234 B2 * 9/2004 Tsuruma ..................... 359/332

* cited by examiner

METHOD OF PRODUCING DOMAIN INVERSION PARTS AND OPTICAL DEVICES

CROSS REFERENCE TO RELATED APPLICATIONS

This application is a continuation of International Application No. PCT/JP2004/011575 having an international filing date of Aug. 5, 2004, which designated the United States, and claims the benefit under 35 USC 119(a)-(d) of Japanese Application No. 2003-297042, filed Aug. 21, 2003, the entireties of which are incorporated herein by reference.

BACKGROUND OF THE INVENTION

1. Field of the Invention

The invention relates to a method of domain inversion parts and optical devices.

2. Related Art Statement

The polarity of a ferroelectric material is forcedly and periodically inverted to form domain inverted structure, so that an optical frequency modulator utilizing a surface acoustic wave and an optical waveguide conversion device utilizing non-linear domain inversion can be realized. Particularly, a wavelength converting device of a high efficiency can be produced by making it possible to convert periodically the polarity of a non-linear optical material. The device can be used for converting light such as solid laser so that a small and light-weight light source of a short wavelength can be provided to be used in applications such as printing, optical information processing and optical measurement and control.

It has been known so called electric field poling process for forming periodically domain inversion structure in a ferroelectric non-linear optical material. According to the process, a comb electrode is formed on one main face of a substrate of a ferroelectric single crystal and a uniform electrode is formed on the other main face, so that a pulse voltage is applied between them. Such method is described in Japanese patent publication 8-220578A.

DISCLOSURE OF THE INVENTION

It has been known to reduce the deviation of optical output power of second harmonic wave by adding MgO or ZnO to lithium niobate single crystal. It is required to irradiate excited light of a high power for obtaining second harmonic wave of a high output power. In this case, however, it was known that the deviation of the second harmonic wave is smaller in a device using lithium niobate doped with MgO or ZnO than in a device using non-doped lithium niobate.

It is required to form periodic domain inversion structure in a single crystal for generating second harmonic wave from a non-linear optical material such as lithium niobate single crystal. Such domain inversion structure can be obtained in non-doped lithium niobate, by arranging comb electrode periodically on the upper face and forming a uniform electrode on the lower face of a substrate and by applying a voltage larger than the resistive electric field thereon. In the case of lithium niobate doped with MgO, however, when a voltage is applied according to the above procedure, periodic domain inversion structure can be formed over a part of the comb electrode and may not be formed in another part of the comb electrode at the same time. It has been difficult to form excellent periodic domain inversion part over the whole of the comb electrode.

An object of the present invention is to form good periodic domain inversion part over the whole of a comb electrode, when the domain inversion part is produced in a substrate of a ferroelectric single crystal of a single domain by so called electric field poling process.

The present invention provides a method of providing domain inversion part in a substrate of a ferroelectric single crystal, by providing a comb electrode on a first main face of a substrate of a ferroelectric single crystal of a single domain and a uniform electrode on a second main face of the substrate and by applying a voltage on the comb and uniform electrodes. It is laminated, on the substrate of a ferroelectric single crystal, an underlying substrate comprising a main body, a first conductive film on a first main face of the main body and a second conductive film provided on a second main face of the main body, so that the uniform electrode is electrically conducted with the first conductive film and a voltage is applied on the comb electrode and the second electrode to form a domain inversion part on the substrate of a ferroelectric single crystal.

The present invention further provides an optical device comprising a domain inversion produced according to the above method.

The inventors have studied the reasons that good periodic domain inversion part cannot be easily formed in single crystal of lithium niobate doped with, for example, MgO, over the whole of a comb electrode and found the followings. That is, lithium niobate doped with MgO has a low resistance electric field, so that a domain inversion structure can be easily formed even at a low voltage. As a result, when a domain inversion region is formed in a part of the comb electrode on the substrate, the resistance of the domain inversion part becomes lower so that a current can be easily flown therein. It can be speculated that the flow of current in the other region where the comb electrode is patterned is interrupted to prevent the formation of domain inversion part. The resistance electric field of lithium niobate doped with ZnO is also lowered in the domain inversion area, as lithium niobate doped with MgO, so that the similar result was expected.

It was studied to laminate a separate underlying substrate 13, as shown in FIG. 1, for uniformly forming domain inversion structure over the whole area where a comb electrode is patterned. That is, a comb electrode 3 is formed on a first main face 2a of a substrate 2 made of, for example, lithium niobate doped with MgO, and a uniform electrode 4 is formed on a second main face 2b of the substrate 2. A separate underlying substrate 13 is laminated under the substrate 2. A first conductive film 6 is formed on a first main face 5a of a main body 5 of the underlying substrate 13, and a second conductive film 7 is formed on the second main face 5b of the main body 5. Although the conductive film 6 and uniform electrode 4 are contacted with each other to electrically connect them according to the present example, a separate conductive object (preferably a conductive film) may be interposed between the first conductive film 6 and uniform electrode 4 to electrically connect them.

For example as shown in FIGS. 2 and 3, insulating oil 8 is contained in a container 9, and a laminate 1 is immersed in the insulating oil 8. An electric wire 11 is connected with the comb electrode 3, and an electric wire 10 is connected with the second conductive film 7. The electric wires 10 and 11 are connected to a high voltage power source 12. A pulse voltage having a predetermined voltage and pulse width is applied, so that periodically domain inversion part between the comb electrode 3 and uniform electrode 4 are formed.

It has been found that a periodically domain inversion part can be uniformly generated over the whole of the comb electrode 3 by laminating the underlying substrate 13 and by applying a voltage through the electrodes 6 and 7 on the underlying substrate 13.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

PREFERRED EMBODIMENTS OF THE INVENTION

Figure 1:
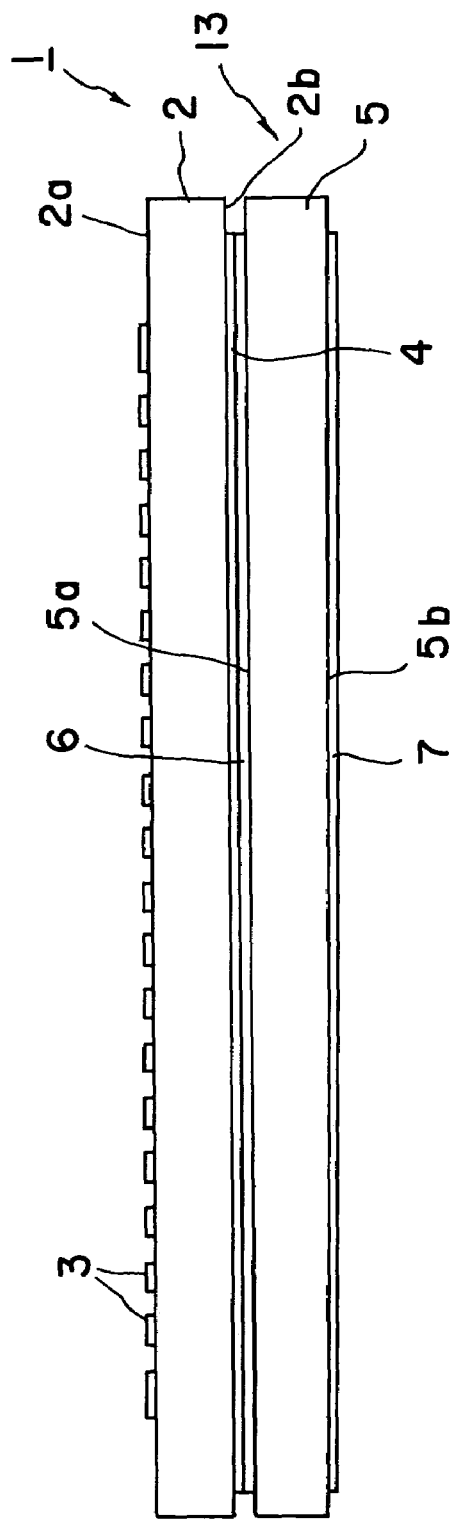
FIG. 1 is a front view showing a laminate 1 of substrates 2 and 5.

The kind of a ferroelectric single crystal forming the substrate 2 of a ferroelectric single crystal is not particularly limited. The material may more preferably be lithium niobate ($LiNbO_3$), lithium tantalite ($LiTaO_3$), a solid solution of lithium niobate-lithium tantalate, or $K_3Li_2Nb_5O_{15}$.

The ferroelectric single crystal may contain one or more metal element(s) selected from the group consisting of magnesium (Mg), zinc (Zn), scandium (Sc) and indium (In) for, for example, further improving the resistance against optical damage of a three-dimentional optical waveguide formed therein. Magnesium is most preferred. It is most preferred the single crystal of lithium niobate, lithium tantalite or a solid solution of lithium niobate-lithium tantalate each doped with Magnesium, on the viewpoint of clarity of the domain inversion property (condition). Further, the ferroelectric single crystal may contain a rare earth element as a dopant. The rare earth element is capable of acting as an additive for laser oscillation. The rare earth element may preferably be Nd, Er, Tm, Ho, Dy or Pr.

When each of these elements for improving the resistance against optical damage or rare earth elements is added, however, the conductivity of the ferroelectric single crystal is increased so as to prevent the uniform formation of the periodic domain inversion part, as described above. The present invention is particularly preferred in this case.

The materials of the comb and uniform electrodes used for electric field poling process are not particularly limited, and preferably be Al, Au, Ag, Cr, Cu, Ni, Ni—Cr, Pd or Ta.

Further, the materials of the first and second conductive films are not particularly limited, and may preferably be Al, Au, Ag, Cr, Cu, Ni, Ni—Cr, Pd or Ta.

It is required that the material of the main body 5 of the underlying substrate has a high insulating property, uniform volume resistivity over the whole material and satisfies a specific structural strength. Such material includes sapphire, quartz or a glass.

The material of the main body 5 may preferably be a ferroelectric single crystal and most preferably be the single crystal of lithium niobate ($LiNbO_3$), lithium tantalite ($LiTaO_3$), a solid solution of lithium niobate-lithium tantalate, or $K_3Li_2Nb_5O_{15}$. Further, they are preferred the off-cut X-plate and off-cut Y-plate of lithium niobate or lithium tantalate each doped with MgO or ZnO are preferred. Although the off-cut angle is not particularly limited, the off-cut angle may preferably be closer to that of an X-plate or Y-plate than that of a Z-plate, and preferably be 1° or larger or 20° or smaller.

The substrate 2 may particularly preferably be so called Z-cut plate, an off-cut X-plate or an off-cut Y-plate. When an off-cut X-plate or off-cut Y-plate is used, the off-cut angle is not particularly limited. Most preferably, the off-cut angle is 1° or larger, or, 20° or smaller.

An insulating oil may be any insulating oil commonly used such as silicone oil and a fluorine-series inert liquid. Further, the magnitude of the applied voltage may preferably be 3 to 8 kV and the pulse frequency may preferably be 1 Hz to 1000 Hz.

The periodic domain inversion part formed according to the present invention may be applied to any optional optical device having the domain inversion part. Such optical device includes, for example, a harmonic wave generating device such as a second harmonic wave generating device. When the present invention is applied as a second harmonic wave generating device, the wavelength of the harmonic wave may preferably be 330 to 1600 nm.

EXAMPLES

Example 1

Figure 2:
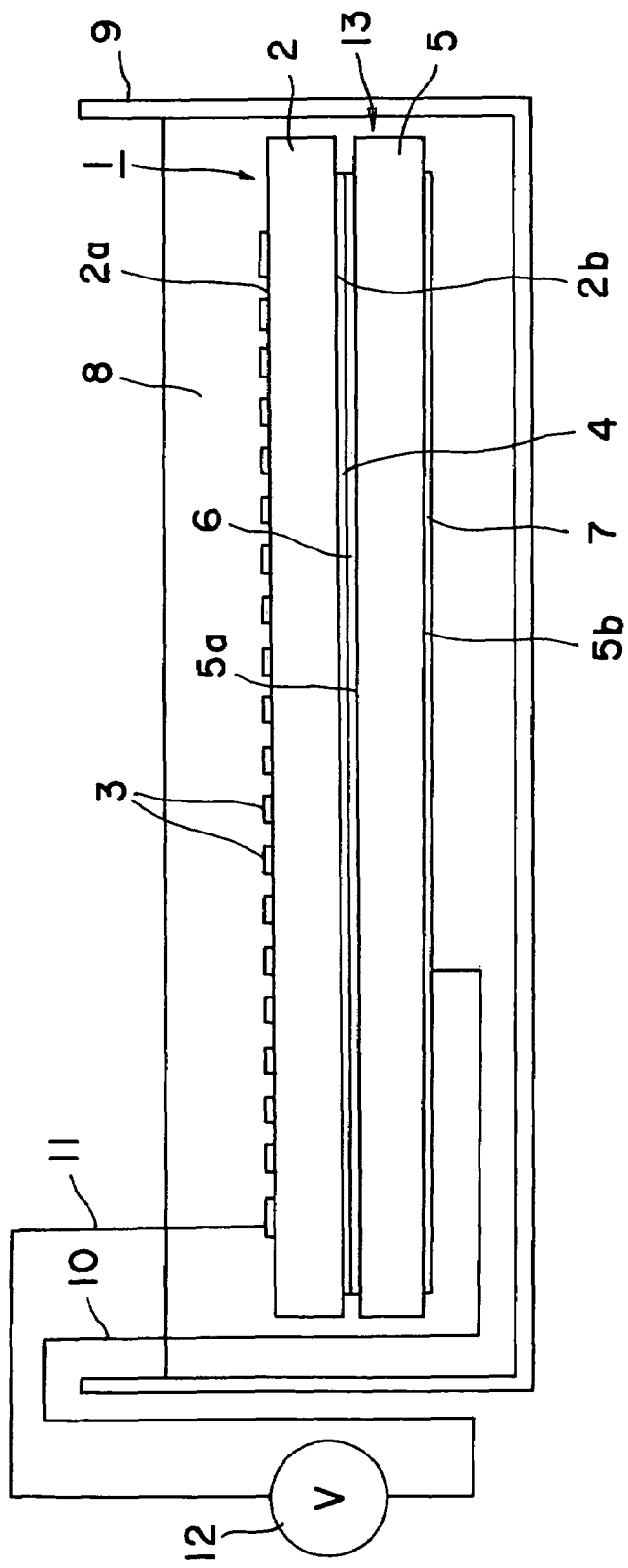
FIG. 2 is a diagram schematically showing a system for forming domain inversion part in a laminate 1 by electric field poling process.
Figure 3:
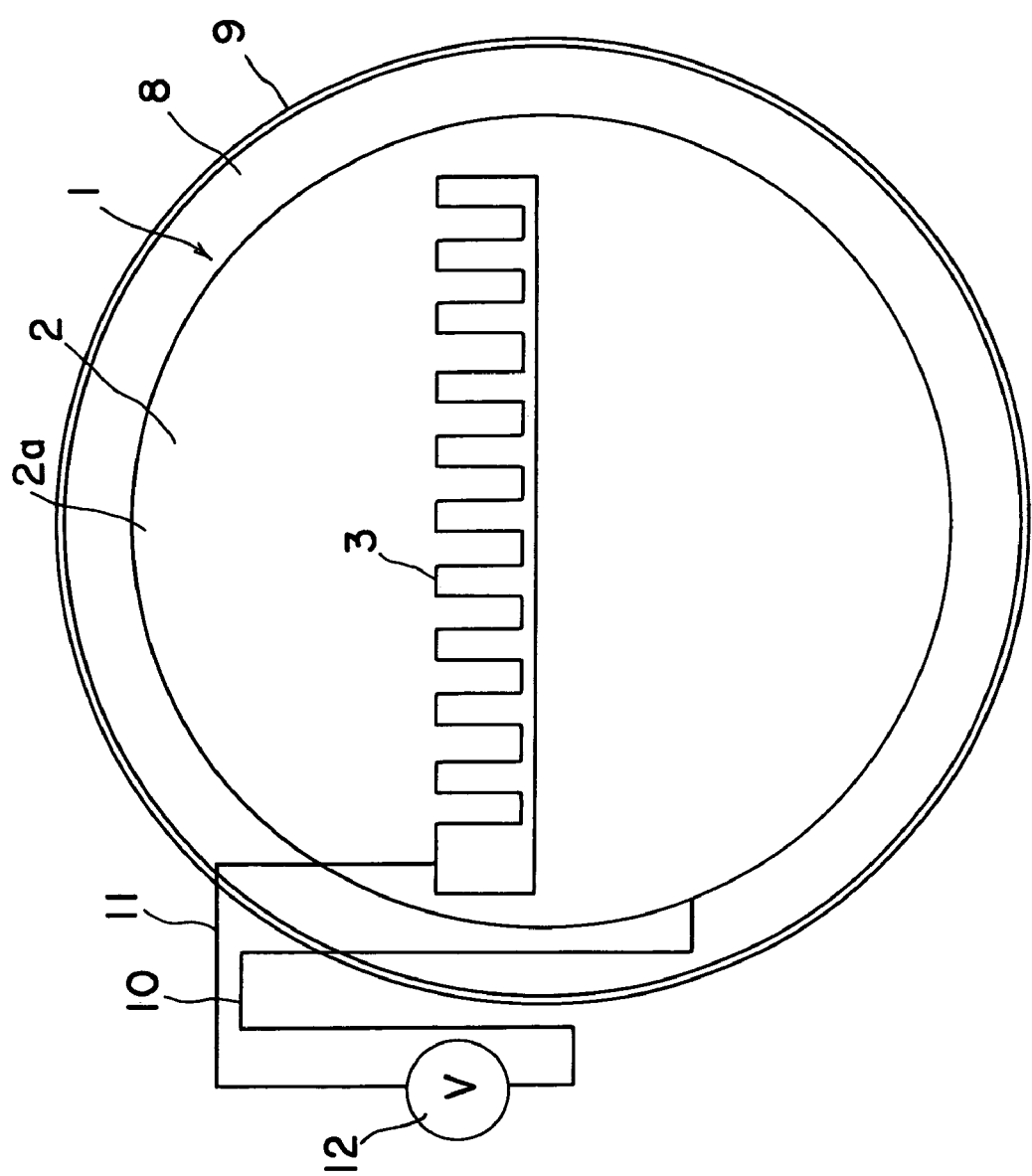
FIG. 3 is a plan view showing the system of FIG. 2.

A laminate 1 shown in FIG. 1 was prepared and a periodic domain inversion structure was formed in the laminate 1 using a system shown in FIGS. 2 and 3 by means of electric field poling process.

Specifically, they were prepared a z-cut substrate 2 having a thickness of 0.5 mm and made of lithium niobate single crystal doped with MgO and a 5° off y-cut substrate 5 having a thickness of 0.5 mm. A comb electrode 3 was patterned on +z-face 2a and a uniform electrode 4 was formed on −z face 2b of the z-cut substrate 2. Uniform electrodes 6 and 7 were formed on the upper and lower faces 5a and 5b of the 5° off y-cut substrate 5, respectively. The period of the domain inversion part was set at 1.8 μm. Ta was used as the materials of the electrodes. The thickness of each of the electrodes was 1000 angstrom. Further, $SiO_2$ film of a thickness of 2000 angstrom was formed on the surface of the comb electrode 3 on the z-cut plate 2. As shown in FIG. 1, the z-cut substrate 2 as the upper side and the 5° off-cut substrate 5 were laminated as the lower side to obtain a laminate 1. The laminate 1 was immersed in an insulating oil bath 8 as shown in FIG. 2. It was applied thereto 700 times a pulse voltage of 6 kV and having a pulse width of 10 Hz at an interval of about 1 second.

Figure 4:
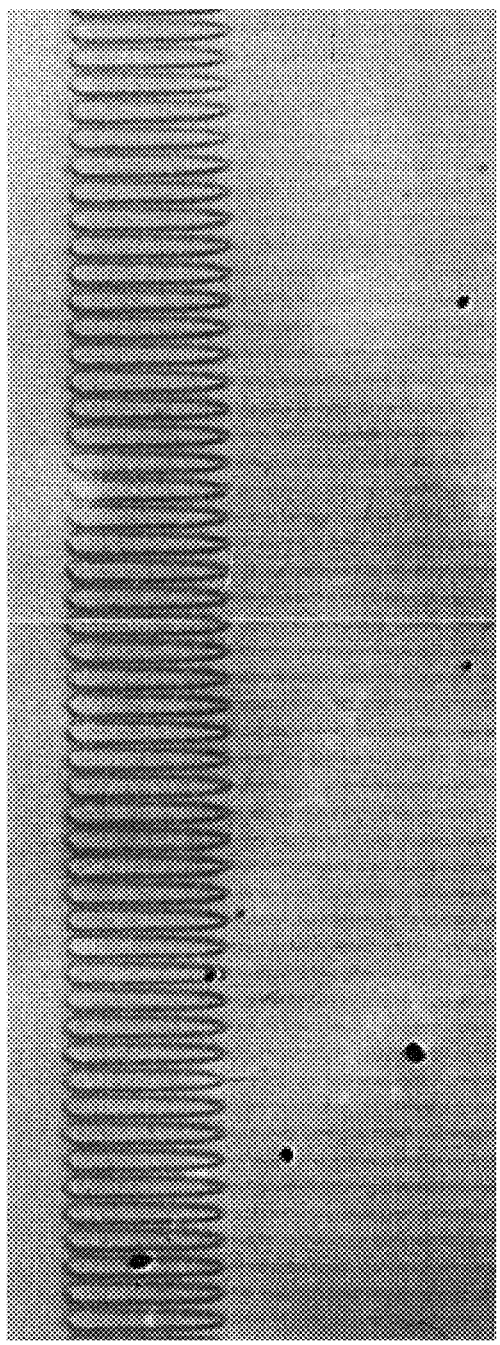
FIG. 4 is a color photograph of a surface 2a (+z face) of a substrate 2 taken by an optical microscope.
Figure 5:
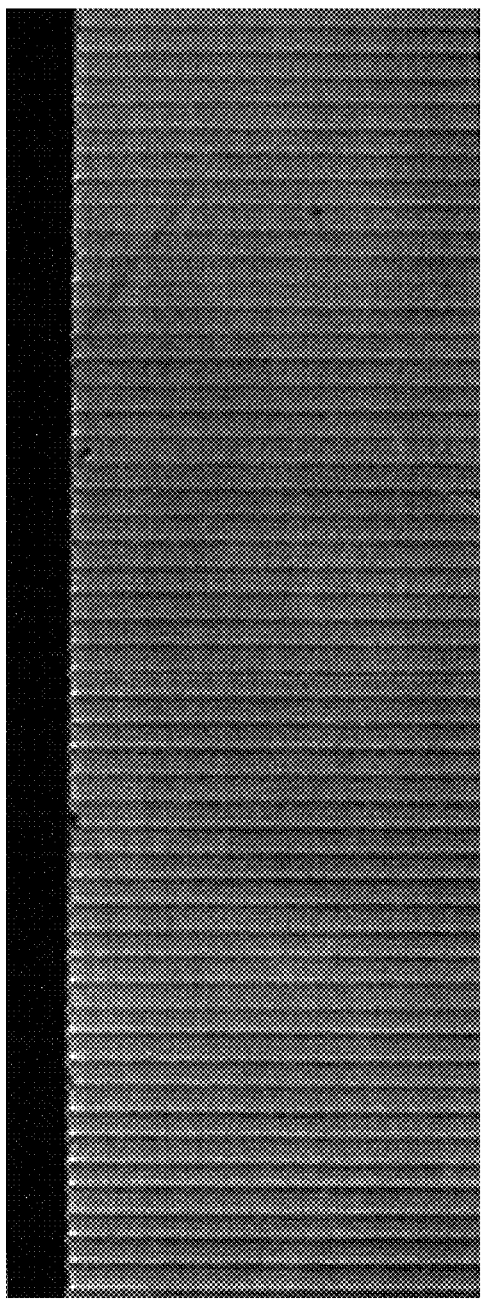
FIG. 5 is a color photograph showing the cross section (y face) of a part where domain inversion part is formed in a substrate 2 taken by an optical microscope.

For confirming whether domain inversion part was generated or not, the substrate was subjected to wet etching using a mixture of fluoric acid and nitric acid (fluoric acid: nitric acid=1:2). FIG. 4 is a color photograph showing the observation of +z face of the surface of a wafer, and FIG. 5 is a color photograph showing the cross section (y face) of the part where the domain inversion part was formed. It was proved that periodic domain inversion structure corresponding to a period of 1.8 μm was uniformly generated and that the inventive process is useful.

The invention claimed is:

1. A method of producing domain inversion part in a substrate of a ferroelectric single crystal by providing a comb electrode on a first main face of said substrate of said ferroelectric single crystal of a single domain and a uniform electrode on a second main face of said substrate and by applying a voltage on said comb electrode and said uniform electrode, said method comprising the steps of:

laminating an underlying substrate on said substrate of said ferroelectric single crystal, said underlying substrate comprising a main body, a first conductive film provided on a first main face of said main body and a second conductive film provided on a second main face of said main body so that said uniform electrode is electrically conducted with said first conductive film; and applying a voltage on said comb electrode and said second conductive film to form a domain inversion part in said substrate of said ferroelectric single crystal.

2. The method of claim 1, wherein said substrate of said ferroelectric single crystal comprises a single crystal selected from the group consisting of lithium niobate, lithium tantalate and a solid solution of lithium niobate-lithium tantalate.

3. The method of claim 1, wherein said single crystal comprises at least one of magnesium oxide and zinc oxide.

4. The method of claim 1, wherein said substrate of said ferroelectric single crystal comprises a Z-cut plate.

5. An optical device comprising the domain inversion part produced by the method of claim 1.

* * * * *